Aug. 26, 1930.  W. J. GAMBLE  1,774,365
METHOD OF REENFORCING WELDED JOINTS
Original Filed Nov. 8, 1921
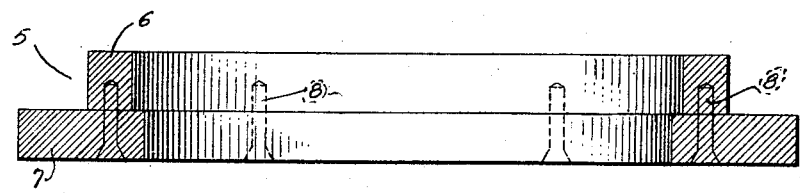
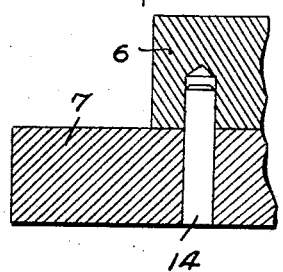
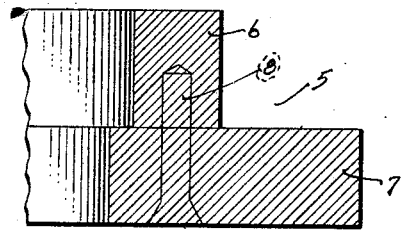
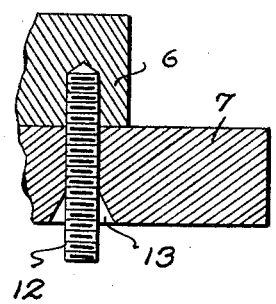
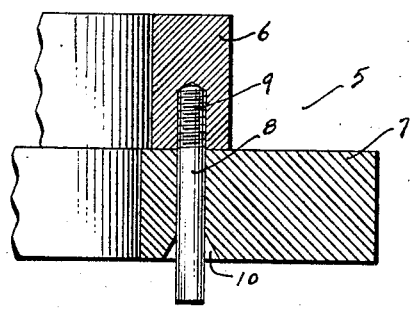
INVENTOR
William J. Gamble
BY
ATTORNEY Patented Aug. 26, 1930

1,774,365

UNITED STATES PATENT OFFICE

WILLIAM J. GAMBLE, OF BUFFALO, NEW YORK; ELIZABETH C. GAMBLE, WILLIAM J. GAMBLE, JR., AND FREDERICK V. GAMBLE EXECUTORS OF SAID WILLIAM J. GAMBLE, DECEASED

METHOD OF REENFORCING WELDED JOINTS

Application filed November 8, 1921, Serial No. 513,859. Renewed February 10, 1930.

My invention relates generally to welded joints and processes for making the same. It is designed particularly for reenforcing welded joints, but is useful as well in joining metal plates or the like not otherwise welded, and in repairing or reenforcing cracked or broken metallic structures.

It is well known to those skilled in the art that in certain classes of tools, it is desirable to have a working face of high carbon steel and a base or body part of softer steel. In such composite tools, the two pieces of material forming the tool are welded together. It is well known that such welded joints are uncertain and that many times when the tool is being hardened or tempered, the working face thereof will become loose and separated from the base portion.

The principal object of my invention has been to provide a process of reenforcing welded joints which shall overcome the disadvantages above enumerated and produce a welded joint, (whether used in a composite tool or otherwise), which shall not separate. By the use of my method, the instability of such joints will be removed, and the workman may be confident that the materials united by the joint will be as one piece of material and will not separate when being hardened and tempered.

The above objects and advantages have been accomplished by my invention. In the accompanying drawings, illustrating my invention, I have shown a welded joint with means for reenforcing the same as applied to a composite tool, but it is to be understood that this is only a typical application of my invention. In the drawings:

Fig. 1 shows a side, sectional elevation of a complete composite tool made in accordance with my invention.

Fig. 2 shows an enlarged, fragmentary, sectional view of the same.

Fig. 3 shows a view of the parts before being finally welded together with the reenforcing means in position at this stage of the process.

Fig. 4 shows a side, sectional elevation of a modified form of my invention.

Fig. 5 is a similar view of another modification of my invention.

In the drawings, 5 represents the tool, having a face portion 6, preferably of high carbon steel so that it may be hardened and tempered, and 7 represents the base or body portion of the tool, which is made of softer steel. In Figs. 1 and 2 the portions 6 and 7 of the tool are shown as having been finally welded together and reinforced by the reinforcing studs 8, which also become a part of the portions 6 and 7 of the tool, when the same is finally welded, as illustrated in Figs. 1 and 2.

Referring to Fig. 3, I show the portions 6 and 7 of the tool initially welded and the stud 8 in position. As here illustrated, the base portion 7 is provided with a plurality of apertures (only one of which is shown in this view) through which the stud 8 may pass. In register with the aperture through this portion, an aperture is also provided in the portion 6. This last aperture is tapped and the screw-threaded end 9 of the stud 8 is screwed therein. The outside end of the hole passing through the body portion 7 is provided with a countersunk end 10. The stud 8 is of such length that it projects beyond the lower face of the body portion 7 (see Fig. 3) before being welded. This projecting end provides sufficient metal to fill the countersunk end 10 when the stud is heated and pressed therein.

In Fig. 4, I have shown the portions 6 and 7 of the tool reinforced by means of a stud 12. As here shown, this stud is screw-threaded into both portions of the tool. The stud extends beyond the portion 6 of the tool which is provided with a countersunk recess 13 surrounding the stud and into which the projecting end of the stud is forced during the welding operation, as hereinbefore described.

Fig. 5 shows a further modification of my invention, in which the stud 14, disposed in the portions 6 and 7 of the tool, is placed in smooth apertures formed in both portions of the tool and in which the stud is secured in position by means of welding. I also show the stud in this figure as terminating at the face of the portion 7 of the tool. No countersunk aperture is provided in this form.

In carrying out my process, the two portions 6 and 7 of the tool are first heated to a welding heat and are placed in position over one another and initially welded by any suitable pressure means. The two initially welded portions of the tool are then heated and annealed, after which the holes above described are drilled and tapped. After the holes have been formed in the portions 6 and 7 of the tool, the studs 8, which have been previously prepared, are passed through the apertures in the body portion 7 and firmly screwed into the apertures in the face portion 6. The tool, with the studs, is now again placed in the furnace and brought to a welding heat, after which it is again placed under pressure. The final heating and pressing forces the projecting ends of the studs into the countersunk ends 10 of the apertures in the base portion 7 and finally welds all of the parts together, so that the face portion 6, base portion 7, and the studs 8 become substantially one solid piece.

In carrying out the process by the means shown in Fig. 4, the portions 6 and 7 of the tool, after being initially welded are provided with apertures which are screw-threaded their entire lengths. The studs 12 are likewise screw-threaded their entire lengths and are inserted in the screw-threaded apertures of the portions 6 and 7 of the tool. The tool is then placed in a furnace and brought to a welding heat in the same manner as that described in connection with the other form of invention. In the form shown in Fig. 5, the portions 6 and 7 of the tool are provided with smooth apertures in which smooth studs 14 are placed.

It is obvious that joints that have been already welded can also be reenforced by my invention. Furthermore, instead of bringing the tool up to a welding heat, only the projecting ends of the studs may be heated and riveted into the countersunk ends of the holes, or these ends may be welded into position by the application of, for instance, an oxy-acetylene flame. While I have shown the stud 14 in Fig. 5 terminating at the face of the portion 7 of the tool, it is obvious that the studs of the other forms of the invention may likewise terminate at the face of the portion 7 of the tool in the various forms of the invention. These and other modifications of the details herein shown and described may be made without departing from the spirit of my invention or the scope of the appended claims; and I do not, therefore, wish to be limited to the exact embodiment of the invention or the steps of the process.

Having thus described my invention, what I claim is:

1. Means for reenforcing welded joints comprising a stud arranged to pass through one of the parts being welded and screw-threaded to the other part, the stud having outwardly projecting end and being welded in position to the part through which it passes.

2. A method of reenforcing welded joints comprising the formation of smooth apertures in one of the parts being welded and registering tapped apertures in the other part, then passing reenforcing means through the smooth apertures and securing them in the tapped apertures, then suitably heating the reenforcing means, and then securing them in position in the smooth apertures.

3. A method of reenforcing welded joints, comprising the initial welding of the parts, then forming registering apertures in the parts, then placing reenforcing means in such apertures, then heating the parts and reenforcing means, and then welding the parts and the reenforcing means together.

4. A method of joining metal plates comprising forming an aperture in one of the plates and a screw-threaded aperture in the other plate, positioning a stud in said apertures with one end screwed in the screw-threaded aperture, and then welding the stud in position in the first mentioned aperture.

5. A method of joining metal plates comprising forming an aperture in one of the plates and a screw-threaded aperture in the other plate, positioning a stud in said apertures with one end screwed in the screw-threaded aperture and the other end projecting through the other aperture, and welding the projecting end of the stud to said other plate.

In testimony whereof, I have hereunto signed my name.

WILLIAM J. GAMBLE.